US006782175B2

(12) United States Patent
Bickham et al.

(10) Patent No.: US 6,782,175 B2
(45) Date of Patent: Aug. 24, 2004

(54) DISPERSION MAP FOR SLOPE COMPENSATING FIBERS

(75) Inventors: Scott R. Bickham, Corning, NY (US); Michael B. Cain, Corning, NY (US)

(73) Assignee: Corning Incorporated, Corning, NY (US)

( * ) Notice: Subject to any disclaimer, the term of this patent is extended or adjusted under 35 U.S.C. 154(b) by 119 days.

(21) Appl. No.: 10/439,619

(22) Filed: May 16, 2003

(65) Prior Publication Data

US 2003/0198448 A1 Oct. 23, 2003

Related U.S. Application Data

(63) Continuation of application No. 09/902,974, filed on Jul. 11, 2001, now Pat. No. 6,580,861.
(60) Provisional application No. 60/230,942, filed on Sep. 6, 2000.

(51) Int. Cl.[7] .................................................. G02B 6/16
(52) U.S. Cl. ......................... 385/123; 385/24; 385/124
(58) Field of Search ................................ 385/123, 124, 385/24

(56) References Cited

U.S. PATENT DOCUMENTS

| | | | |
|---|---|---|---|
| 5,218,662 A | | 6/1993 | Dugan |
| 5,365,362 A | * | 11/1994 | Gnauck et al. ............. 359/160 |
| 5,448,674 A | * | 9/1995 | Vengsarkar et al. ........ 385/123 |
| 5,559,920 A | | 9/1996 | Chraplyvy et al. |
| 5,781,678 A | | 7/1998 | Sano et al. |
| 5,793,917 A | | 8/1998 | Yoshimura |
| 5,838,867 A | | 11/1998 | Onishi et al. |
| 6,393,188 B1 | * | 5/2002 | Jeong et al. ................. 385/123 |
| 6,404,950 B1 | * | 6/2002 | Tsukitani et al. ........... 359/161 |
| 6,430,347 B1 | * | 8/2002 | Cain et al. .................. 385/123 |
| 6,532,330 B1 | * | 3/2003 | Mollenauer .................. 385/123 |
| 6,583,905 B1 | * | 6/2003 | Bonato et al. .............. 398/158 |
| 6,594,428 B1 | * | 7/2003 | Tanaka et al. .............. 385/123 |
| 2002/0041747 A1 | * | 4/2002 | Tirloni et al. ............... 385/123 |
| 2002/0164117 A1 | | 11/2002 | Onishi et al. .................. 385/27 |

FOREIGN PATENT DOCUMENTS

| | | | | |
|---|---|---|---|---|
| EP | 0 777 347 A2 | | 6/1997 | ........... H04B/10/18 |
| EP | 1 035 671 A2 | | 9/2000 | ........... H04B/10/18 |

OTHER PUBLICATIONS

Tanaka et al., 320 Gbit/s(32×10.7 Gbit/s) error–free transmission over 7280 km using dispersion flattened fibre link with standard SMF and slope compensating DCF, Electronics Laetters, Oct. 14, 1999, vol. 35, No. 21, pp. 1860–1862.
André ELETERIO, *Implementing DWDM and UDWM in Repeatered and Repeaterless Submarine Networks*, IBC's Second Annual Conference on Submarine Communications, NEC Corporation, Nov. 17, 1999.
David Peckham, *New Fiber Designs for Ocean Systems*, KMI Corporation's, 5th Fiberoptic Submarine Systems Symposium, Baltimore, Maryland, Jun. 17–18, 1999.
Jim Ryan, *Next–Generation NZ–DSF fibers will balance performance characteristics*, Lightwave, Mar. 2000, pp. 146–152.

(List continued on next page.)

*Primary Examiner*—Ben Healy
*Assistant Examiner*—Tina M Lin
(74) *Attorney, Agent, or Firm*—Joseph M. Homa; Foley & Lardner (57) ABSTRACT

An optical transmission system is provided. The system includes a series of consecutive blocks of optical fiber. Each block of the system includes a first, second and third series of spans of optical fiber, where the second series of spans compensates for accumulated dispersion in the first and third series in the wavelength range of transmission. Optionally either the first or third series can be omitted.

18 Claims, 8 Drawing Sheets

OTHER PUBLICATIONS

Hidenori Taga et al., *Experimental demonstration of 680 Gbit/s capacity for the medium–haul undersea lightwave cable sytems*, Optical Fiber Communication Conference (OFC) of 2000, pp. 50–52, paper FC7–1.

Kiyoaki Takashina et al., *1T bit/s (100ch×10G bit/s) WDM Repeaterless Transmission over 200km with Raman Amplifier*, Optical Fiber Communication Conference (OFC) of 2000, pp. 53–55, paper FC8–1.

Takehiro Tsuritani et al., *Performance Comparison between SCDCF–based System and RDF–based System in Slope–Compensating Transoceanic WDM Transmission*Optical Fiber Communication Conference (OFC) of 2000, pp. 47–499, paper FC6–1.

T. Matsuda et al, "Dispersion Management Scheme for Suppressing FWM in DWDM Transmission", 1998 IEEE, pp. 372–373.

I. Morita et al, "40 Gbit/s×16 WDM Transmission Over 2000 KM Using Dispersion Managed Low–Nonlinear Fiber Span", ECOC 2002, vol. IV, p. 25 (Post Deadline Paper T 1.5).

M. Murakami et al, "Long–Haul WDM Transmission Using Higher Order Fiber Dispersion Management", Journal of Lightwave Technology, vol. 18, No. 9, Sep. 2000, pp. 1197–1204.

M. Murakami et al, "Quarter Tbit/s (25×10 Gbit/s) Over 9288 km WDM Transmission Experiment Using Nonlinear Supported RZ Pulse in Higher Order Fiber Dispersion Managed Line", Electronics Letters, Mar. 18, 1999, vol. 35, No. 6, pp. 488–489.

M. Murakami et al, "Quarter Terabit (25×10 Gb/s) Over 9288 km WDM Transmission Experiment Using Nonlinear Supported RZ Pulse in Higher Order Fiber Dispersion Managed Line", ECOC'98, Sep. 20–24, 1998, pp. 79 & 81.

M. Murakami et al, "Long–Haul 16×10Gb/s WDM Transmission Experiment Using Higher Order Fiber Dispersion Management Technique", IEEE Photonics Technology Letters, vol. 11, No. 7, Jul. 1999, pp. 898–900.

K. Mukasa et al, "Novel Network Fiber to Manage Dispersion at 1.55$\mu$m with Combination of 1.3$\mu$m Zero Dispersion Single Mode Fiber", ECOC 97, Sep. 22–25, 1997, Conference Publication No. 448, pp. 127–130.

K. Tanaka et al, "320 Gbit/s (32×10.7 Gbit/s) error–free transmission over 7280km using dispersion flattened fibre link with standard SMF and slope compensating DCF", Electronics Letters, Oct. 14, 1999, vol. 35, No. 21, pp. 1860–1861.

T. Tsuritani et al, "1Tbit/s (10×10.7 Gbit/s) transoceanic transmission using 30nm wide broadband optical repeaters with $A_{eff}$–enlarged positive dispersion fibre and slope–compensating DCF", Electronics Letters, Nov. 25, 1999, vol.35, No. 24, pp. 2126–2128.

T. Tsuritani et al, "Performance comparison between SCDCF–based system and RDF–based system in slope–compensating transoceanic WDM transmission", Electronics Letters, Mar. 2, 2000, vol. 36, No. 5, pp. 447–448.

T. Tsuritani et al, "Performance Comparison between SCDCF–based System and RDF–based System in Slope–Compensating Transoceanic WDM Transmission", OFC 2000, 7010, Mar. 2000, vol. 4, pp. 47–49.

\* cited by examiner

DISPERSION MAP FOR SLOPE COMPENSATING FIBERS

This application claims the benefit of U.S. Provisional Patent Application No. 60/230,942, filed Sep. 6, 2000, and continuation U.S. patent application Ser. No. 09/902,974, filed Jul. 11, 2001.

FIELD OF INVENTION

This invention relates to an optical transmission system with an improved dispersion map and corresponding method. The transmission system and method are particularly applicable to long haul submarine transmission systems.

BACKGROUND OF THE INVENTION

Nonlinear optical effects such as four-wave mixing (FWM) and Cross-Phase Modulation (XPM) can degrade the optical signal transmission through long-haul optical networks. Increasing the dispersion in the fibers decreases both FWM and XPM. Dispersion causes broadening in transmitted optical pulses due to the difference in transmission speeds of light at different wavelengths. Because the pulse is broadened, the power density is decreased over the pulse, and thus optical effects which are non-linear in power density are reduced.

Dispersion units are typically given as picoseconds/nanometer-kilometer (ps/nm-km), where the kilometer units correspond to the length of the fiber. The dispersion product of a span of fiber is a measure of the dispersion accumulated over the span. The dispersion product for a fiber of length L with a dispersion D is the product of L and D, i.e., L·D. Thus, the dispersion product of a span of fiber having individual section of length $L_i$ and dispersion $D_i$ is the sum of the individual dispersion products $\Sigma L_i \cdot D_i$.

While dispersion reduces nonlinear effects such as FWM and XPM, the accumulated dispersion in these long-haul systems must be compensated. In long-haul repeatered transmission systems using optical fibers, the interplay of the accumulation of large amounts of the chromatic dispersion and self-phase modulation (SPM), creates noise and distortion in the optical system. Dispersion maps, i.e., the dispersion as a function of the transmission distance, attempt to minimize the effects of chromatic dispersion.

Current submarine transmission systems generally have span lengths in the 45–50 km range and use a dispersion map which provides an average dispersion at a wavelength of 1560 nm that is approximately −2 ps/nm-km in the approximately 90% of the transmission spans. The negative dispersion fibers used in those spans may be single fiber types or combinations of two fibers, in which case the fiber following the amplifier has a larger effective area to reduce nonlinear effects and the second fiber has a lower dispersion slope. The dispersion slope of a fiber is the change in the dispersion per unit wavelength. After approximately 10 spans, the accumulated negative dispersion is then compensated at a given wavelength by an additional span of single mode fiber (SMF). We denote the combination of the approximately 10 negative dispersion spans with the compensating span of SMF as a block.

Figure 1:
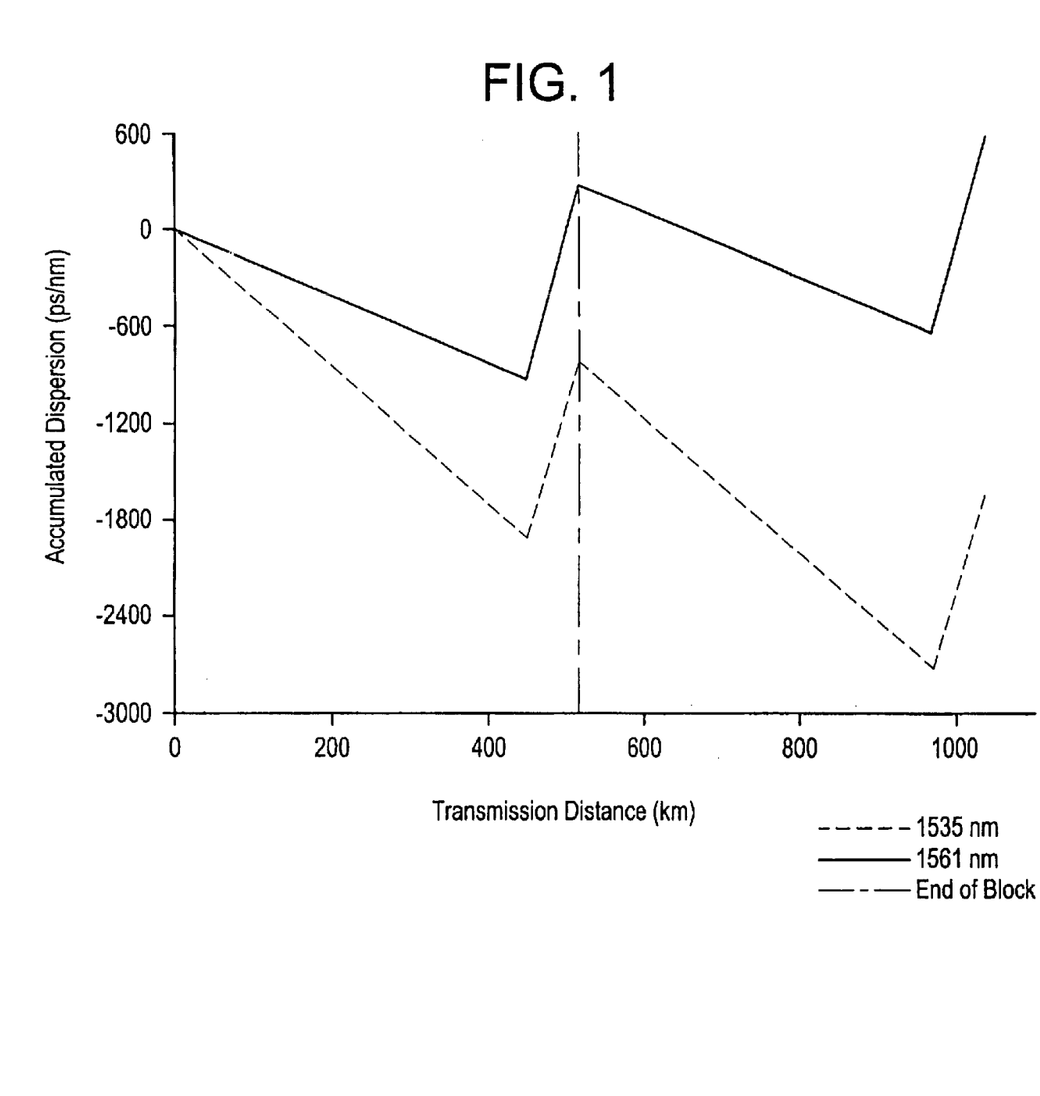
FIG. 1 is a graph showing the accumulated dispersion as a function of transmission distance at the end channels for a conventional 64 channel system.

FIG. 1 shows the accumulated dispersion at the end channels for a 64 channel system with end channels having wavelengths of 1535 nm and 1561 nm. The dispersion map in FIG. 1 has a period of 520 km, which is compatible with typical distances of recirculating loop test-beds used to characterize the performance of the fibers. In this system the accumulated dispersion at a wavelength between the end channels is brought back to zero after nine spans of negative dispersion fiber. However, the accumulated dispersion is not compensated at other wavelengths.

The primary drawback to the dispersion map for the system of FIG. 1 is that the transmission fibers all have positive dispersion slope, which leads to the rapid accumulation of large dispersion differences across the channel plan. In other words, the accumulated dispersion varies substantially over the channels which have different corresponding wavelengths. The dispersion is kept close to zero only at the wavelength, between the end channels, that is compensated by the periodic insertion of SMF. The difference between the accumulated dispersion of the end channels in FIG. 1 is over 2000 ps/nm after 1040 km. For a typical submarine transmission distance of 6000 km, the accumulated dispersion or dispersion product would be over 10,000 ps/nm. This can be partially mitigated through the use of pre-compensation and post-compensation fibers. However, the propagation of more channels or over longer distances is prohibitively difficult with this dispersion map.

BRIEF SUMMARY OF THE INVENTION

An advantage can be achieved if the fibers in an optical transmission system can be arranged to yield an average chromatic dispersion near zero for all the channels having wavelengths within the transmission wavelength range. However due to XPM effects, the average dispersion of each channel should be substantially different from zero in each transmission span, but should be periodically compensated to limit the accumulated dispersion. This dispersion compensation scheme should result in an increased number of channels over long distances for transmission applications which use a number of channels for transmission, such as wavelength division multiplexing (WDM). There are also significant cost savings in the elimination of most of the dispersion compensation at the transmitter and receiver ends of the transmission system.

One embodiment according to the present invention is an optical transmission system. The optical transmission system includes optical fiber and transmits in a predetermined wavelength range bounded by a first wavelength and a second wavelength and having a substantially central wavelength. The system comprises a series of consecutive blocks of optical fiber, the consecutive blocks optically coupled to each other. Each consecutive block of optical fiber comprises a first series of N spans of optical fiber optically coupled to each other, where $N \geq$ zero, the spans of the first series arranged consecutively; a second series of M spans of optical fiber optically coupled to each other, where $M \geq$ zero, the spans of the second series arranged consecutively; and a third series of O spans of optical fiber optically coupled to each other, where $O \geq$ zero and $N+O \geq 2$, the spans of the third series arranged consecutively, the first, second, and third series arranged consecutively. The individual dispersion products of the first, second, and third series are substantially not zero at each of the first, substantially central, and second wavelengths, and the sum of the dispersion products of the first, second, and third series is substantially zero at each of the first, substantially central, and second wavelengths. The optical transmission system may also include a plurality of optical amplifiers that are positioned before each span to amplify the optical signal.

It will be understood, that fiber spans in addition to those forming the spans of the series can be configured to shape the pulses or compensate the optical signal dispersion. For example, a first set of fiber spans may be placed near the transmitter to broaden the optical pulses, thereby reducing both intra-channel and inter-channel non-linear effects. In an advantageous embodiment, the effect of the first set of fiber spans can be removed or compensated by a second set of fiber spans placed near the receiver.

Another embodiment according to the present invention is an optical transmission system. The optical transmission system includes optical fiber and transmits in a predetermined wavelength range bounded by a first wavelength and a second wavelength and having a selected wavelength and a substantially central wavelength. The system comprises a series of consecutive blocks of optical fiber, the consecutive blocks optically coupled to each other. Each consecutive block of optical fiber comprises a first series of N spans of optical fiber optically coupled to each other, where N≧zero, the spans of the first series arranged consecutively; a second series of M spans of optical fiber optically coupled to each other, where M≧zero, the spans of the second series arranged consecutively; and a third series of O spans of optical fiber optically coupled to each other, where O≧zero and N+O≧2, the spans of the third series arranged consecutively, the first, second, and third series arranged consecutively. The individual dispersion products of the first, second, and third series are substantially not zero at the substantially central wavelength, the sum of the dispersion products of the first, second, and third series is substantially zero at the selected wavelength, and the average dispersion slope in each block at the selected wavelength is between −0.01 and 0.01 ps/nm$^2$-km. The optical transmission system may also include a plurality of optical amplifiers that are positioned before each span to amplify the optical signal.

According to another aspect of the invention, methods of transmitting an optical signal between a transmitter and a receiver in a predetermined wavelength range bounded by a first wavelength and a second wavelength are provided corresponding to the above optical transmission systems.

DETAILED DESCRIPTION OF THE PREFERRED EMBODIMENTS

Figure 2:
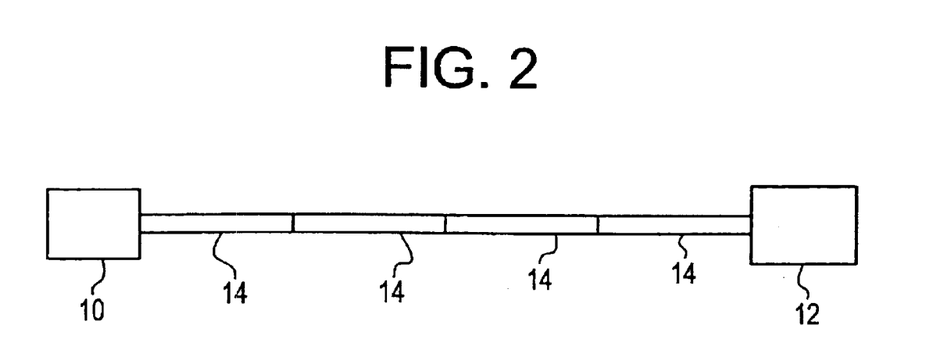
FIG. 2 is a schematic of an optical transmission system according to an embodiment of the invention.

FIG. 2 is a schematic of an optical transmission system according to an embodiment of the invention. The transmission system includes a transmitter 10 that transmits optical signals to a receiver 12 through a series of blocks 14 of optical fiber. The optical signals are transmitted over a number of channels, each channel having a different wavelength in a chosen wavelength range bounded by end wavelengths (or channels). The transmission wavelength range is preferably within a wavelength range appropriate for long haul transmission. The transmission wavelength range may be within the range of 1500 to 1630 nm, for example. The transmission system may transmit the optical signals through channels by WDM, for example.

Figure 3:
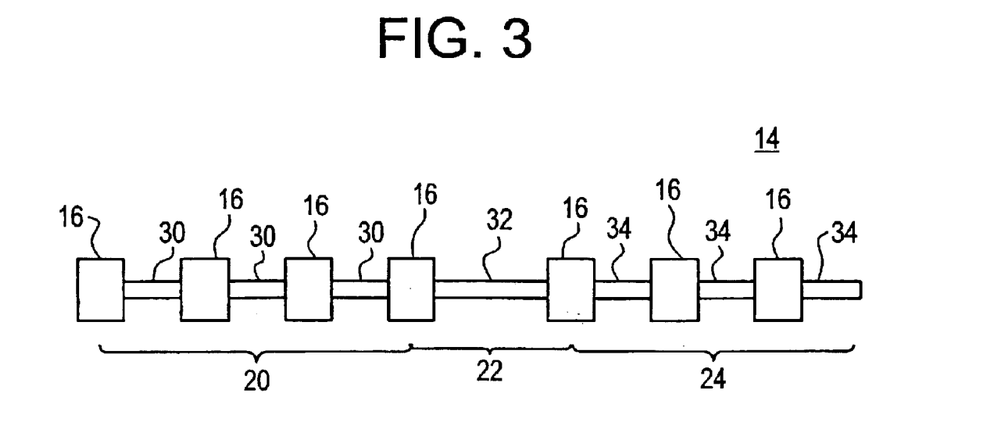
FIG. 3 is a schematic of an embodiment of the invention where the first, second and third series of spans are present.

The blocks 14 of optical fiber are arranged between the transmitter 10 and receiver 12 such that the transmitter is optically coupled to a first block of the series of blocks of optical fiber. The first block is the block adjacent the transmitter 10. In operation, the transmitter 10 launches an optical signal into the first block. The receiver 12 is optically coupled to the last block of the series of blocks adjacent the receiver. The receiver 12 receives the optical signal transmitted through the last block. The blocks 14 of the series of blocks are arranged consecutively and are optically coupled to each other. Each block contains three or more spans of optical fiber Details of a block 14 of the series of blocks according to one embodiment of the invention are shown in FIG. 3. The block 14 is divided into three sections, a first series 20, a second series 22, and a third series 24 of spans. The spans in each of the series are arranged consecutively. The first series, second series, and third series have N, M, and O spans, respectively, where N≧zero, M≧zero, and O≧zero. The total number of spans in the first and third series, N+O, is greater than or equal to 2, i.e., there are at least 2 spans total in the first and third series. When the first or third series has zero spans, that series is not included in the optical transmission system. The optical transmission system may also include a plurality of optical amplifiers 16 that are positioned before each span to amplify the optical signal if amplification is desired or required.

The respective spans 30 and 34 of the first and third series 20 and 24 may have, for example, a fiber length ranging from 20 to 100 km. The fiber length of an entire block may be, for example, in the range of 300 to 700 km.

It is expected that typically the total number of spans in the first and third series will be larger than the number in the second series. Typically only one or two spans in the second series will be sufficient to compensate for accumulated dispersion in the first and third series, i.e., M is typically equal to one or two. The total number of spans in the first and third series, N+O, may be, for example, in the range of seven to ten.

The dispersion map of the blocks according to one aspect of this embodiment is as follows. The optical transmission system transmits in a wavelength range bounded by end wavelengths, i.e., a first wavelength and a second wavelength. The wavelength range also includes a substantially central wavelength located substantially centrally between the first and second wavelengths. The individual dispersion products (accumulated dispersion) of each individual series of spans is substantially not zero at each of the first, second, and substantially central wavelengths. In general, it is desirable that an optical signal pulse traveling through the optical transmission system will encounter dispersion at each channel wavelength to avoid nonlinear effects.

While the individual dispersion product of each series of spans is substantially not zero, the sum of the dispersion products of the first, second and third series is substantially zero at each of the first, substantially central, and second wavelengths. Thus, the block compensates for dispersion not only at the substantially central wavelength, but also at the end wavelengths of the transmission wavelength range. In general, this will mean that the block will compensate for accumulated dispersion for all of the wavelengths in the transmission range.

It is preferred that the second series has a dispersion product which is opposite in sign to the sign of the dispersion products of the first and third series. Thus, the second series acts to compensate for the accumulated dispersion in the first and third series. If the sum of the dispersion products of the first and third series is negative, the dispersion product range may be, for example, from −300 to −3000 ps/nm. More preferably the range is from −800 to −1500 ps/nm. If the sum of the dispersion products of the first and third series is positive, the dispersion product range may be, for example, from 300 to 3000 ps/nm. More preferably the range is from 800 to 1500 ps/nm.

The respective spans 30, 32, and 34 of the first 20, second 22, and third 24 series may in general comprise more than one type of fiber. For example, each span 30 of the first series 20 may comprise a SMF with a positive dispersion at the substantially central wavelength and a slope compensating fiber (SCF) with a negative dispersion at the substantially central wavelength such that the dispersion product for each span 30 is negative. The SMF and SCF fibers may be optically coupled directly or via an intermediate fiber to reduce the splice loss. Likewise each span 34 of the third series may comprise similar fibers to those in the spans 30 of the first series 20. In this case, each span 32 of the second series 22 may comprise substantially only a single mode fiber with positive dispersion at the substantially central wavelength. Thus, the spans 32 of the second series 22 will compensate for the accumulated dispersion of the first and third series 20 and 24.

Alternatively, each span 30 of the first series 20 may comprise a first fiber with a positive dispersion at the substantially central wavelength and a second fiber with a negative dispersion at the substantially central wavelength such that the dispersion product for each span 30 is positive. The SMF and SCF fibers may again be optically coupled directly or via an intermediate fiber to reduce the splice loss. Likewise each span 34 of the third series 24 may comprise fibers similar to those in the span 30. In this case, the spans 32 of the second series 22 may comprise substantially only a single mode fiber with negative dispersion at the substantially central wavelength. Again, the spans 32 of the second series 22 will compensate for the accumulated dispersion of the first and third series 20 and 24.

The spans 30 and 34 of the first and third series may have the same dispersion product at the end wavelengths and substantially central wavelength. However, this is not required. The spans of the first and third series may also have different dispersion products.

Preferably, the ratio of the dispersion and dispersion slope, i.e, the change in dispersion slope per unit wavelength of light, is approximately equal for the fibers in the spans. This allows for the total compensation of dispersion for each channel in each block.

FIG. 3 shows an embodiment of the invention where both the first and third series 20 and 24 of spans are present. In the embodiment of FIG. 3 the number of spans, N and O, respectively in the first and third series may be three, for example, and the number of spans in the second series 22 may be one, for example. The optical transmission system of FIG. 3 may also include a plurality of optical amplifiers 16 that are positioned before each span to amplify the optical signal if amplification is desired or required.

Figure 4:
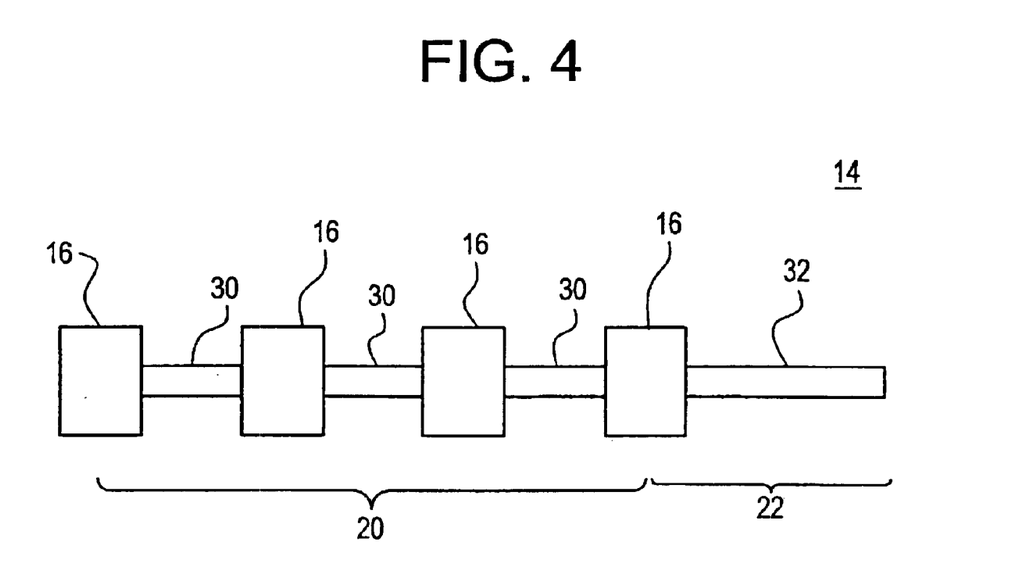
FIG. 4 is a schematic of an embodiment of the invention where only the first and second series of spans are present.

Alternatively, the third series 24 may be omitted, as shown in the embodiment of FIG. 4 where only the first and second series 20 and 22 are present. Thus, in the embodiment of FIG. 4 the number of spans O in the third series 24 is zero. In this embodiment the dispersion product for the second series 22 has substantially the same magnitude and is opposite in sign to the dispersion product for the first series. The optical transmission system of FIG. 4 may also include a plurality of optical amplifiers 16 that are positioned before each span to amplify the optical signal if amplification is desired or required.

Figure 5:
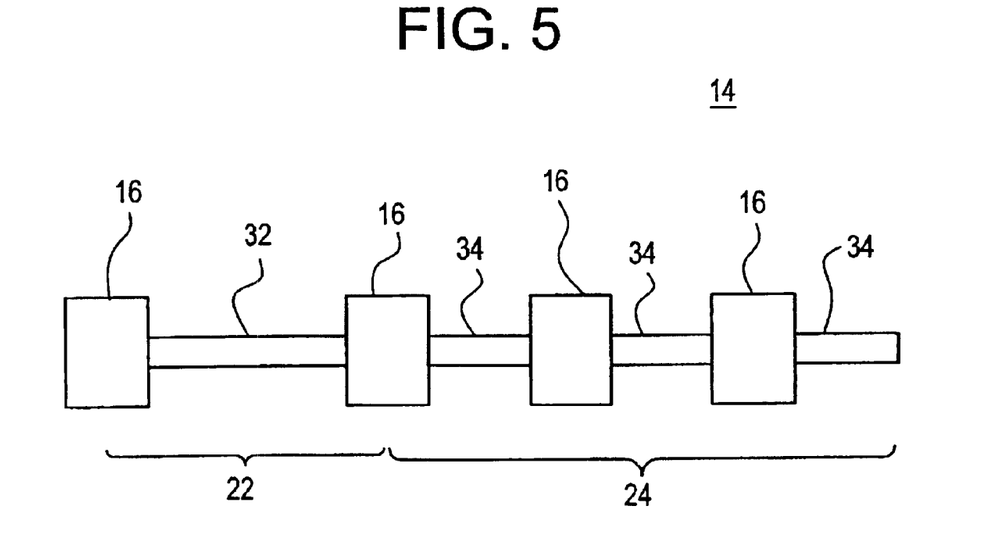
FIG. 5 is a schematic of an embodiment of the invention where only the second and third series of spans are present.

As another alternative, the first series 20 may be omitted, as shown in the embodiment of FIG. 5 where only the second and third series 22 and 24 are present. Thus, in the embodiment of FIG. 5 the number of spans N in the first series 20 is zero. In this embodiment the dispersion product for the second series 22 has the same magnitude and is opposite in sign to the dispersion product for the third series 24. The optical transmission system of FIG. 5 may also include a plurality of optical amplifiers 16 that are positioned before each span to amplify the optical signal if amplification is desired or required.

Figure 6:
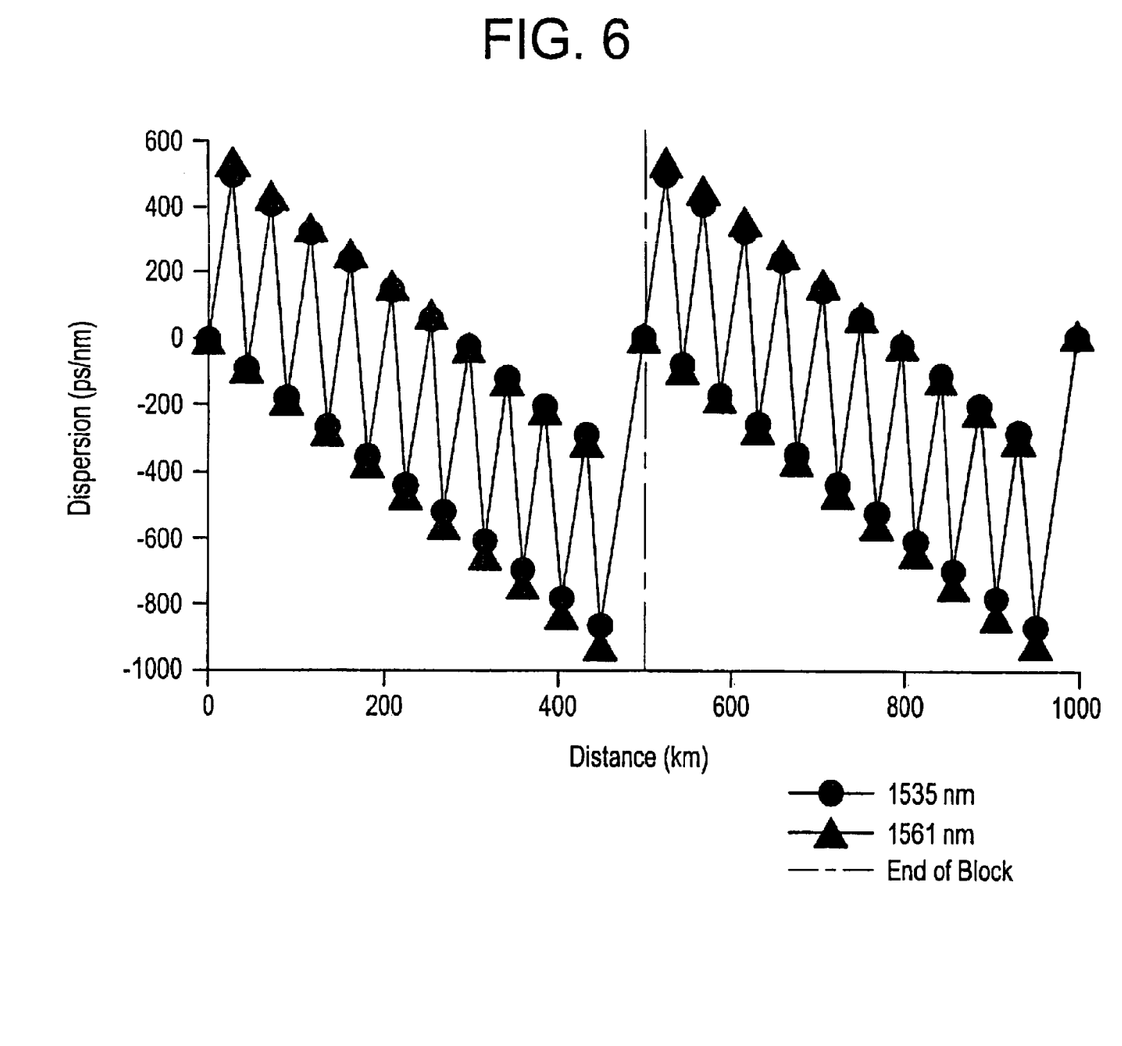
FIG. 6 is a graph showing the accumulated dispersion as a function of transmission distance for the end wavelengths of a transmission range for one example of the embodiment of FIG. 5.

FIG. 6 shows the accumulated dispersion as a function of transmission distance for the end wavelengths of a transmission range for one example of the embodiment of FIG. 4. In this embodiment, the first block ends at approximately 500 km, and the second block then begins as noted by the dotted line. The end wavelengths are 1535 nm and 1561 nm. The accumulated dispersion at 1535 nm is shown as a line with closed circles between spans for illustration. The accumulated dispersion at 1561 nm is shown as a line with closed triangles between spans for illustration. As seen in FIG. 6 the dispersion at 1535 nm almost exactly tracks the dispersion at 1561 nm throughout the block.

The total dispersion for the end channels is shown in FIG. 6 for a system containing a first series of spans that is compensated by a second series of spans at the end of the block. This particular system has 64 channels in between 1535 and 1561 nm, but the dispersion map may be applied to different bandwidths and channel spacings. The average dispersion for the beginning, end and substantially central wavelength of the first series of spans is negative, but is completely compensated by the second series of spans. The dispersion of all channels in this system move in unison and there is no net dispersion or dispersion slope.

In this example the number of spans in the first series of the first block is ten, and the number of spans in the second series is one. The first series in this example has a total fiber distance of approximately 450 km. The single span of the second series begins at approximately 450 km and ends at approximately 500 km, i.e., a span of approximately 50 km.

In this example it can be seen that the dispersion product for each of the spans 30 in the first series 20 is slightly negative. The preferred range is between −1 and −3 ps/nm-km. The positive dispersion product of the single span 32 of the second series 22 completely compensates for the sum of the dispersion products of the ten spans of the first series 20 at both the end wavelengths of 1535 and 1561 nm. Thus, the entire range of wavelengths between the end wavelengths should likewise be compensated. FIG. 6 also shows a second block beginning at the end of the first block at a transmission distance of approximately 500 km.

It is preferred that if fibers with different effective areas are used, the fibers with the largest effective areas are arranged immediately after the amplifiers 16 shown in FIGS. 3–5. This is because the power density of the transmitted optical pulses should be the greatest immediately after amplification. Because the power density will be the greatest at that location immediately after amplification, non-linear effects will also be the greatest. Large effective areas will reduce the power density and thus non-linear effects. Thus, it is preferred that the fibers with the largest effective area are arranged immediately after the amplifiers 16.

If SMF and SCF are used in the systems, it is expected that the SMF will be arranged immediately after the amplifiers 16. Typical SMF used for long haul transmission have a larger effective area than typical SCF. For example, SMF typically have an effective area of greater than 80 $\mu m^2$ while SCF fibers typically have an effective area in the range of 20–35 $\mu m^2$. The larger effective area of the SMF immediately after amplification will reduce the power density and thus nonlinear effects. Of course if the SCF used have a smaller effective area than that of the SMF used, the SCF would preferably be placed immediately after the amplifier.

Figure 7:
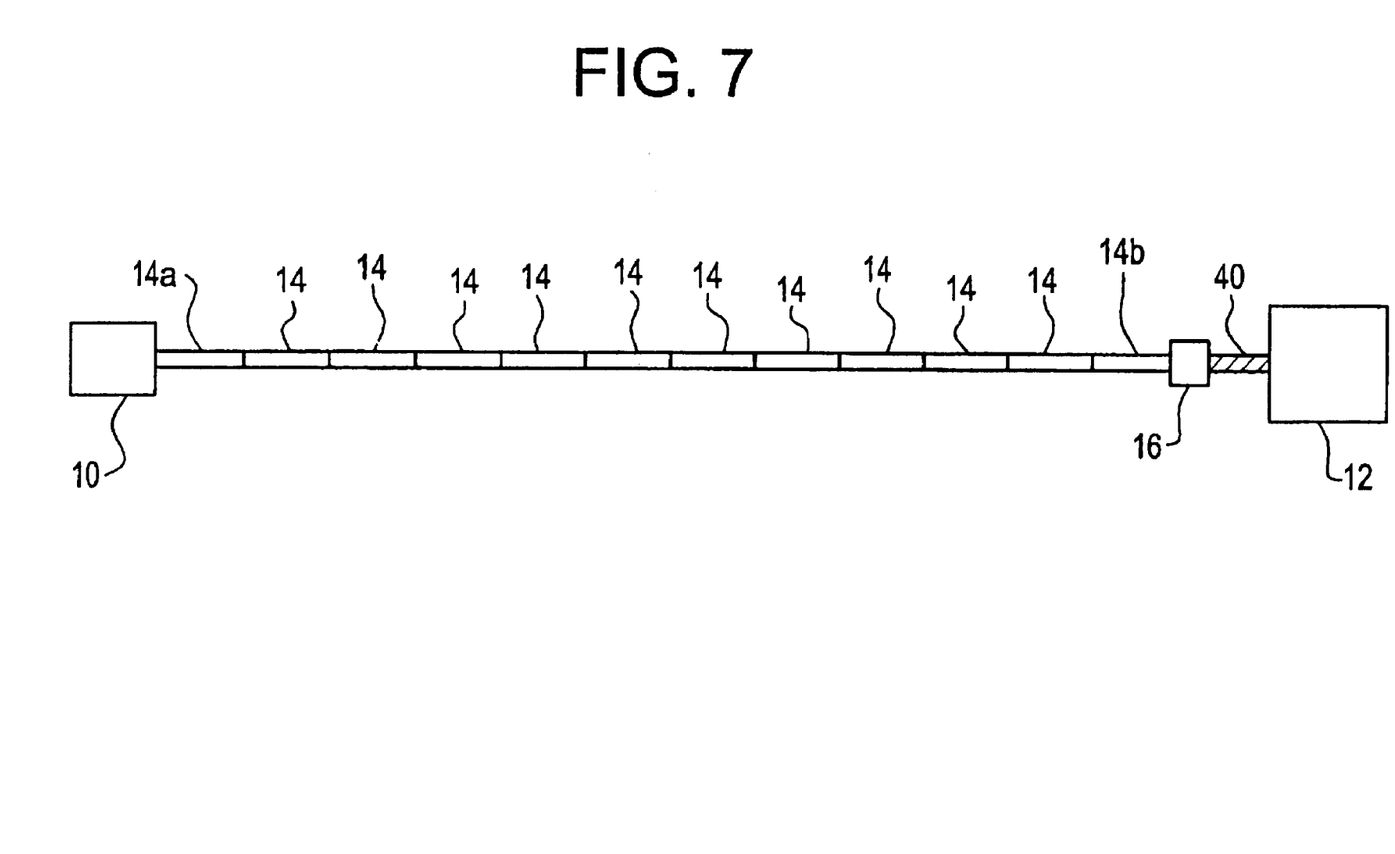
FIG. 7 is a schematic of an optical transmission system according to an embodiment of the invention where the dispersion slope is not perfectly compensated in each block.

FIG. 7 shows an embodiment of the invention where the compensation is not perfect for each block, considered in isolation. FIG. 7 shows a total of twelve blocks in the system. Of course the number of blocks may also be more or less than twelve. The transmitter 10 is positioned before the first block 14a and the receiver 16 is positioned after the last block 14b in FIG. 7. Because the dispersion is not completely compensated for in the range of transmitted wavelengths, one or more fiber spans 40 compensate the dispersion. The last fiber spans 40 are disposed between the last block 14b and the receiver 16. Alternatively or concurrently, a first set of spans (not shown) may be disposed between the transmitter 10 and the first block 14a to compensate for some or all of the dispersion. As is mentioned above the optional set of fiber spans located between the transmitter and the first block can be configured to advantageously shape (for example broaden) the pulses.

Figure 8:
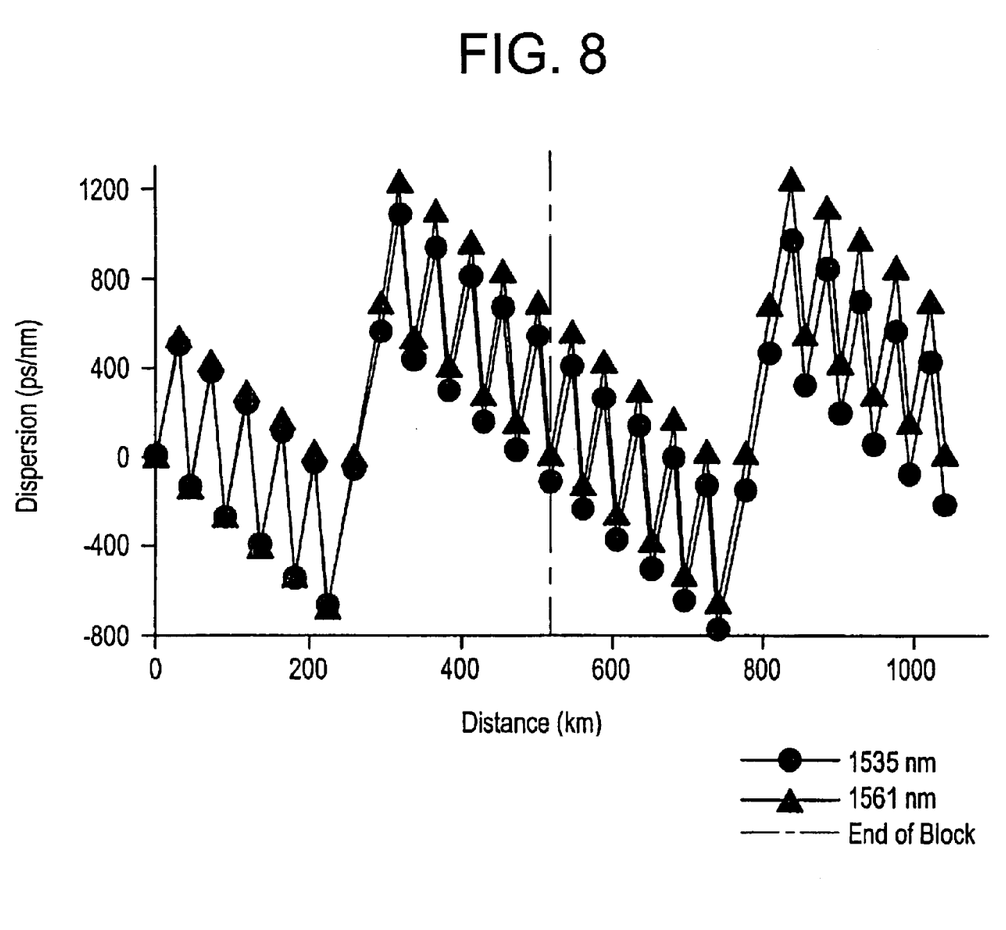
FIG. 8 is a graph of the accumulated dispersion for the system of FIG. 7.

FIG. 8 is a graph of the accumulated dispersion for the system of FIG. 7 with less than optimal dispersion compensation for each block, considered in isolation. While the preceding embodiments (other than the embodiment of FIG. 7) have perfect compensation in a block, i.e., the total dispersion product in a block is substantially zero for both of the end wavelengths and all the wavelengths between. It is contemplated that the blocks may have some slight residual dispersion or dispersion slope. FIG. 8 illustrates the accumulated dispersion for such a system.

The dispersion map shown in FIG. 8 is for a 64 channel system which contains a second series of spans in the center of a block containing a first and third series. The average dispersion slope of the spans in the first and third series is zero, and the second series of spans compensates the dispersion at a substantially central wavelength bounded by the beginning and end wavelengths. The positive dispersion slope of the second series of spans produces a net positive dispersion slope in each block that is evident from the increase in the dispersion difference between the beginning and end channels with increasing distance.

It can be seen in FIG. 8 that the difference in dispersion between the end wavelengths of 1535 nm and 1561 nm continues to increase over the transmission distance. The accumulated dispersion at 1535 nm is shown as a line with closed circles between spans for illustration. The accumulated dispersion at 1561 nm is shown as a line with closed triangles between spans for illustration. In FIG. 8, the accumulated dispersion over a total of twelve blocks is shown. As mentioned above, the total number of blocks may be different than twelve. As seen in FIG. 8 the difference in the accumulated dispersion at the end wavelengths at the end of the last block is about 235 ps/nm after 1040 km. The dispersion of each channel should be compensated prior to arriving at the receiver. In this embodiment it is preferable that the average dispersion in the first and third series of blocks of the system be between −1 and −3 ps/nm-km and that the average dispersion slope for the block be between −0.01 and 0.01 ps/nm$^2$-km. FIG. 8 also illustrates the case where the compensating fiber is situated in the center of the block, rather than the end, which is the case for the dispersion map shown in FIG. 6.

It is also contemplated that a last span may be introduced into the system between the last block and the receiver when the total dispersion products in the individual blocks are not substantially zero at the end wavelengths and all of the wavelengths in the transmission range. The last span would compensate for this significant accumulated dispersion. Alternatively, some or all of the dispersion may be compensated by arranging a first span (not shown) between the transmitter and the first block, in which case the span may also be used to shape the pulses.

It is also contemplated that in the embodiment of FIG. 7, the number of spans, N and O respectively, in the first and third series may be either zero or greater than zero as long as their sum is greater than or equal to two. In other words, the second series may be at either end of the block or somewhere between the ends.

A method of transmitting an optical signal between a transmitter and receiver in a wavelength range bounded by the end wavelengths and including a substantially central wavelength between the end wavelengths is also contemplated. A series of consecutive blocks of optical fiber, such as the consecutive blocks described in the above embodiments, is provided. An optical signal is then transmitted from the transmitter to the receiver via the series of consecutive blocks. Advantageously, the optical signal benefits from the compensation of the dispersion, not only at the substantially central wavelength, but at the end wavelengths also.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. An optical transmission system including optical fiber, the optical transmission system transmitting in a predetermined wavelength range bounded by a first wavelength and a second wavelength and having a selected wavelength and a substantially central wavelength, the system comprising:

a series of consecutive blocks of optical fiber, the consecutive blocks optically coupled to each other, wherein each consecutive block of optical fiber comprises:

a first series of N spans of optical fiber optically coupled to each other, where N≧zero, the spans of the first series arranged consecutively, wherein each span of the first series comprises a fiber type having positive dispersion at the substantially central wavelength and a fiber type having negative dispersion at the substantially central wavelength;

a second series of M spans of optical fiber optically coupled to each other, where M>zero, the spans of the second series arranged consecutively, wherein each span of the second series comprises substantially only a single type of fiber; and a third series of O spans of optical fiber optically coupled to each other, where O≧zero and N+O≧2, the spans of the third series arranged consecutively, wherein each span of the third series comprises a fiber type having positive dispersion at the substantially central wavelength and a fiber type having negative dispersion at the substantially central wavelength, wherein the first, second, and third series are arranged consecutively;

wherein the individual dispersion products of the first, second, and third series are substantially not zero at the substantially central wavelength, the sum of the dispersion products of the first, second, and third series is substantially zero at the selected wavelength; and wherein at least a portion of the optical fiber having the fiber type having positive dispersion has an effective area greater than 80 $\mu m^2$.

2. The system of claim 1 wherein at least a portion of the optical fiber having the fiber type having negative dispersion has an effective area in the range of 20–35 $\mu m^2$.

3. The system of claim 1 wherein the average dispersion slope in each block at the selected wavelength is between −0.01 and 0.01 ps/nm$^2$-km.

4. The optical transmission system of claim 1, wherein the second series has a dispersion product which is opposite in sign to the sign of the dispersion products of the first and third series.

5. The optical transmission system of claim 1, wherein the sum of the dispersion products of the first and third series is negative.

6. The optical transmission system of claim 1, wherein the sum of the dispersion products of the first and third series is positive.

7. The optical transmission system of claim 1, wherein the first and second wavelengths are both within the range of 1500 to 1630 nm.

8. The optical transmission system of claim 1, wherein the ratio of the dispersion and dispersion slope is approximately equal for the fibers in at least one span.

9. The optical transmission system of claim 1, wherein one of O and N is equal to zero, and the other of O and N is in the range of 7 to 10.

10. An optical transmission system including optical fiber, the optical transmission system transmitting in a predetermined wavelength range bounded by a first wavelength and a second wavelength and having a substantially central wavelength, the system comprising:

a series of consecutive blocks of optical fiber, the consecutive blocks optically coupled to each other, wherein each consecutive block of optical fiber comprises:

a first series of N spans of optical fiber optically coupled to each other, where N≧zero, the spans of the first series arranged consecutively, wherein each span of the first series comprises a fiber type having positive dispersion at the substantially central wavelength and a fiber type having negative dispersion at the substantially central wavelength;

a second series of M spans of optical fiber optically coupled to each other, where M>zero, the spans of the second series arranged consecutively, wherein each span of the second series comprises substantially only a single type of fiber having positive dispersion at the substantially central wavelength; and a third series of O spans of optical fiber optically coupled to each other, where O≧zero and N+O≧2, the spans of the third series arranged consecutively, wherein each span of the third series comprises a fiber type having positive dispersion at the substantially central wavelength and a fiber type having negative dispersion at the substantially central wavelength, wherein the first, second, and third series are arranged consecutively;

wherein the individual dispersion products of the first, second, and third series are substantially not zero at each of the first, substantially central, and second wavelengths, and the sum of the dispersion products of the first, second, and third series is substantially zero at each of the first, substantially central, and second wavelengths; and wherein at least a portion of the optical fiber having the fiber type having positive dispersion has an effective area greater than 80 $\mu m^2$.

11. The system of claim 10 wherein at least a portion of the optical fiber having the fiber type having negative dispersion has an effective area in the range of 20–35 m$^2$.

12. The system of claim 10 wherein the average dispersion slope in each block at the selected wavelength is between −0.01 and 0.01 ps/nm$^2$-km.

13. The optical transmission system of claim 10, wherein the dispersion product for each of the spans in the first series is negative.

14. The optical transmission system of claim 10, wherein the second series has a dispersion product which is opposite in sign to the sign of the dispersion products of the first and third series.

15. The optical transmission system of claim 10, wherein the sum of the dispersion products of the first and third series is between −800 and −1500 ps/nm.

16. An optical transmission system including optical fiber, the optical transmission system transmitting in a predetermined wavelength range bounded by a first wavelength and a second wavelength and having a substantially central wavelength, the system comprising:

a series of consecutive blocks of optical fiber, the consecutive blocks optically coupled to each other, wherein each consecutive block of optical fiber comprises:

a first series of N spans of optical fiber optically coupled to each other, where N≧zero, the spans of the first series arranged consecutively, wherein each span of the first series comprises a fiber type having positive dispersion at the substantially central wavelength and a fiber type having negative dispersion at the substantially central wavelength;

a second series of M spans of optical fiber optically coupled to each other, where M>zero, the spans of the second series arranged consecutively, wherein each span of the second series comprises substantially only a single type of fiber having negative dispersion at the substantially central wavelength; and a third series of O spans of optical fiber optically coupled to each other, where O≧zero and N+O≧2, the spans of the third series arranged consecutively, wherein each span of the third series comprises a fiber type having positive dispersion at the substantially central wavelength and a fiber type having negative dispersion at the substantially central wavelength, wherein the first, second, and third series are arranged consecutively;

wherein the individual dispersion products of the first, second, and third series are substantially not zero at each of the first, substantially central, and second wavelengths, and the sum of the dispersion products of the first, second, and third series is substantially zero at each of the first, substantially central, and second wavelengths; and wherein at least a portion of the optical fiber having the fiber type having positive dispersion has an effective area greater than 80 $\mu m^2$.

17. The system of claim 16 wherein at least a portion of the optical fiber having the fiber type having negative dispersion has an effective area in the range of 20–35 $\mu m^2$.

18. The optical transmission system of claim 16, wherein the average dispersion slope in each block at the selected wavelength is between –0.01 and 0.01 ps/nm$^2$-km.

* * * * *